Nov. 30, 1965  R. J. HAMMERS  3,220,089
HOLDERS FOR CUTTING INSERTS
Filed Dec. 6, 1963  2 Sheets-Sheet 1

Raymond J. Hammers,
Inventor.
Koenig, Pope, Senniger and Powers,
Attorneys.

United States Patent Office 3,220,089
Patented Nov. 30, 1965

3,220,089
HOLDERS FOR CUTTING INSERTS
Raymond J. Hammers, Peoria, Ill., assignor to Trasco Inc., Peoria, Ill., a corporation of Illinois
Filed Dec. 6, 1963, Ser. No. 328,718
7 Claims. (Cl. 29—96)

This invention relates to holders for cutting inserts, and more particularly to such holders of the so-called cartridge type, namely a holder for a cutting insert (e.g., a carbide insert) employed in machining operations, such as boring and milling operations, the holder carrying the insert being mounted on a tool body.

Among the several objects of the invention may be noted the provision of an improved cartridge-type cutting insert holder which may be readily secured in properly adjusted position on a tool body (such as a boring bar, for example) and which, as so secured, is firmly supported in adjusted position on the tool body to allow close cutting tolerances and to reduce vibration and chatter; the provision of a holder such as described which may be made of relatively short length; the provision of a holder, such as described, adapted for positive loosening of the clamping means which holds the cutting insert; and the provision of a holder such as described which is economical to manufacture. Other objects and features will be in part apparent and in part pointed out hereinafter.

The invention accordingly comprises the constructions hereinafter described, the scope of the invention being indicated in the following claims.

In the accompanying drawings, in which one of various possible embodiments of the invention is illustrated, FIG. 1 is a plan view of a cartridge-type holder made in accordance with this invention;

Corresponding reference characters indicate corresponding parts throughout the several views of the drawings.

Figure 1:
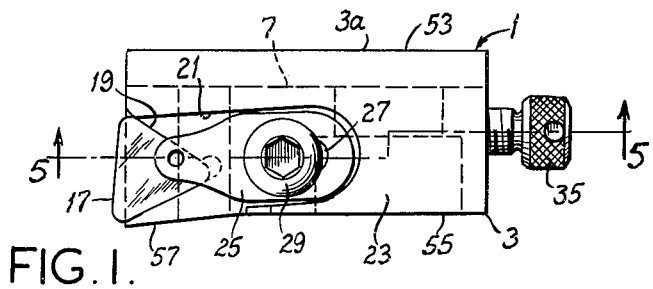
Figure 2:
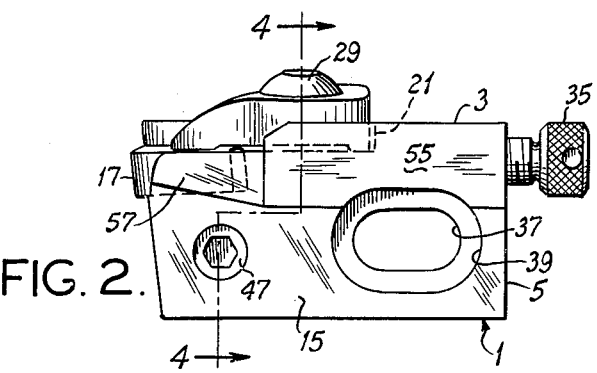
FIG. 2 is a front elevation of FIG. 1.

Referring to the drawings, a cartridge-type cutting insert holder of this invention is shown to comprise an elongate metal block designated in its entirety by the reference character 1. Block 1 has a head portion 3 and a stem portion 5 extending lengthwise thereof, the stem portion 5 being narrower than the head portion and the head portion 3 projecting laterally outward beyond the stem portion along one side of the block. The stem portion 5 has a flat face 7 on this side of the block which is engageable with a face 9 of a tool body 11 (see FIG. 3). The projection of the head portion, which is designated 3a, constitutes a rib or key. It is of rectangular form in transverse section and is adapted to fit in a groove or keyway 13 in the tool body. The face 15 of the stem portion opposite the flat face 7 is angled so that the stem portion, in transverse section, is of tapered form, narrowing in the direction away from the head.

A cutting insert 17, which is made of carbide, for example, is seated in a seat 19 at one end of the head portion 3 of the block. As shown, insert 17 is of triangular shape, and seat 19 is of corresponding triangular shape. This seat 19 is constituted by a triangular pocket at the bottom of a larger recess 21 in the broad outside face 23 of the head portion 3. Insert 17 is clamped in its seat 19 by an elongate clamp jaw 25 having a longitudinal slot 27 receiving a clamp screw 29 threaded in a tapped hole 31 in block 1. The bottom of the triangular pocket is angled both transversely and longitudinally in respect to the block to provide the desired side and back rake for the cutting insert, and the hole 31 and clamp screw are angled in correspondence with the transverse angling of the bottom of the pocket.

The head portion 3 of the block 1 has a threaded hole 33 therein extending inward from the end of the block opposite the cutting insert end of the block. An adjusting screw 35 is threaded in this hole. This screw is for effecting longitudinal adjustment to the block 1 on a tool body as will appear.

Figure 5:
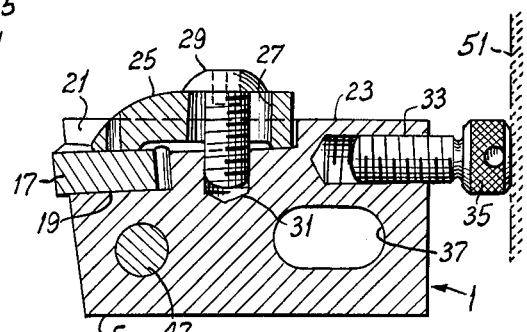
FIG. 5 is a section on line 5—5 of FIG. 1.
Figure 6:
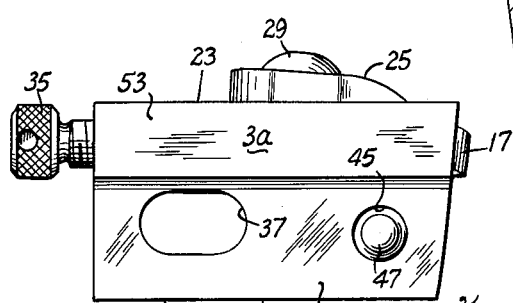
FIG. 6 is a rear elevation of FIG. 1.

Stem portion 5 of the block 1 has an elongate longitudinal slot 37 therethrough adjacent the adjusting screw end of the block. This slot 37 is spaced from the head portion 3 and the threaded hole 33 for the adjusting screw 35 as appears best in FIG. 5. The slot is enlarged toward the outer angled face of the stem portion 5 as indicated at 39. It is adapted to receive a screw 41 which is threaded in a tapped hole 43 in the tool body for securing the block to the tool body. Slot 37 allows for movement of the block relative to the screw 41 for longitudinal adjustment of the block with respect to the tool body. The hole 33 and screw 35 extend inward from the respective end of the block (its right end as viewed in FIG. 5) a distance greater than the spacing of the outer (right) end of slot 37 from this end of the block.

Toward the cutting insert end of the block, the stem portion 5 has a threaded hole 45 in which is threaded an adjusting screw 47. The inner end 49 of this screw is engageable with face 9 of the tool body for making small angular adjustments of the block with respect to the tool body.

It will be observed that the block 1 is generally of L-shape in transverse section, the head and stem portions 3 and 5 constituting the legs of the L. The head portion projects laterally beyond the inside face 7 of the stem portion to provide the rib 3a, and has the generally flat top face 23 and generally flat inner and outer side faces 53 and 55 substantially at right angles thereto. Face 7 of the stem portion is substantially parallel to face 53. The outer side face 55 of the head portion flares outward toward the insert end (which may be referred to as the forward end) of the block as indicated at 57. Triangular recess 19 is located above stem portion 5 at the flaring forward end of the head portion 3, with one side of this recess open at said end of the head portion.

Figure 3:
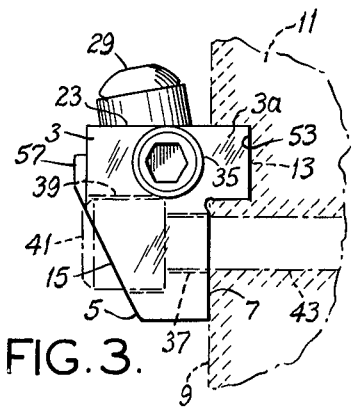
FIG. 3 is an end elevation of FIG. 1, showing the holder applied to a tool body.
Figure 4:
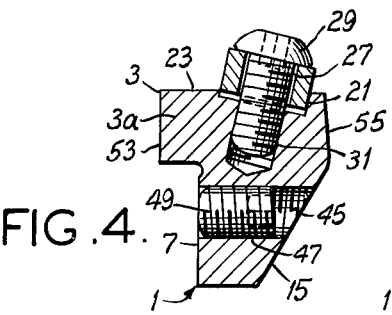
FIG. 4 is a section on line 4—4 of FIG. 2.

As shown in FIG. 3, the block 1 is secured to tool body 9 by passing screw 41 through the slot 37 from the outside angled face 15 of the stem portion 5 of the block and threading the screw 41 in the hole 43 in the tool body. The projecting rib or key 3a of the head fits in keyway 13 of the tool body. The head of adjusting screw 35 engages a face 51 of the tool body (see FIG. 5), this face being generally at right angles to the screw 35. With the screw 41 slightly loose, screw 35 is turned to effect longitudinal adjustment of the block relative to the tool body, and then screw 41 is tightened securely to hold the block on the tool body. A slight bending of the block for small angular adjustment of the block may be effected by turning screw 47.

The block 1 being generally of L-shape in transverse section (the head and stem portions 3 and 5 constituting the legs of the L) is rigidly mounted on the tool body in such manner as to resist deflection under forces acting on the block during cutting operations, thereby allowing close cutting tolerances and reducing vibration and chatter. The mounting of the block, with its rib 3a in groove 13 and its face 7 engaging face 9 of the tool body is similar to a bracket mounting, force applied to the cutting insert being resisted by engagement of face 7 with face 9 of the tool body. With slot 37 located in the stem portion 5 of the block, spaced from hole 33 for the adjusting screw 35, so that hole 33 and screw 35 may extend inward for a considerable distance without intersecting the slot, the block may be made of relatively short length.

Figure 7:
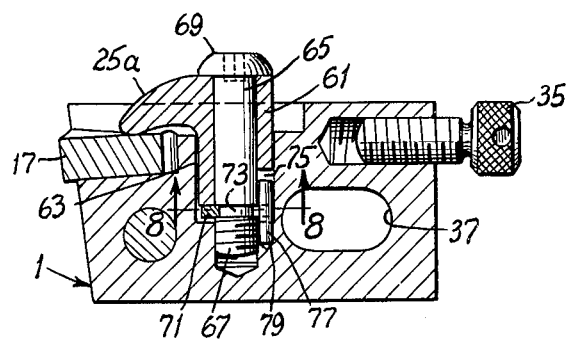
FIG. 7 is a view similar to FIG. 5 showing a modification.
Figure 8:
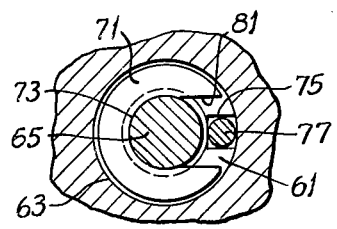
FIG. 8 is a section on line 8—8 of FIG. 7.

FIGS. 7 and 8 show a modification of the clamping means for the insert 17, adapted for positive raising of the jaw which clamps the insert. As shown, the clamping means comprises a clamp jaw 25a integrally formed on one end (the outer end) of a cylindric sleeve 61. This sleeve is axially slidable in a cylindric recess 63 in the block 1. A clamp screw 65 extends through the sleeve and is threaded in a tapped hole 67 of smaller diameter than recess 63 extending axially from the bottom of the recess. The screw has a head 69 engageable with the outer end of the sleeve and a collar 71 spaced from its end engageable with the inner end of the sleeve, and constituted by a C-shaped snap washer snapped into an annular groove 73 in the screw. The sleeve 61 has a slot 75 extending longitudinally thereof from its inner end. A pin 77 is press-fitted in a hole 79 at the bottom of recess 63 and extends through the gap 81 in the C-shaped washer 71 into the slot 75. The sleeve 61, being retained between the head 69 of the screw and the washer 71, is axially movable with the screw on turning the screw in either direction, and is prevented from turning by the pin 77, while permitting turning of the screw to tighten and loosen the clamp jaw 25a. On loosening the screw, washer 71 pushes the sleeve and the associated clamp jaw 25a outward, and, on tightening the screw, the head 69 of the screw pushes the sleeve and jaw inward.

Figure 9:
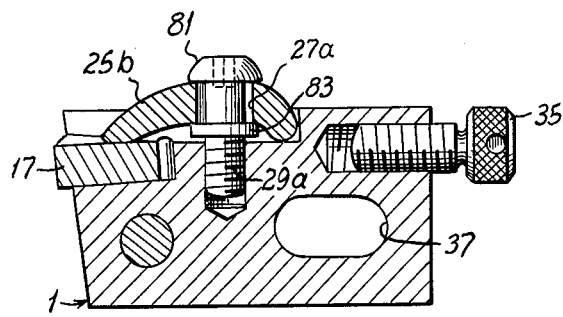
FIG. 9 is a view similar to FIG. 5 showing another modification.

FIG. 9 shows a further modification of the clamping means for positively raising the jaw which clamps the insert. Here the clamp jaw, which is designated 25b, is retained on the screw 29a between the head 81 of the screw and a flange 83 on the screw so that the jaw will move in both directions with the screw. The jaw has a slot 27a similar to slot 27 for receiving the portion of the screw between the head and the flange, and the screw is rotatable relative to the jaw.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A cartridge-type cutting insert holder comprising an elongate block generally of L-shape in transverse section having a head portion and a stem portion extending lengthwise thereof constituting the legs of the L, said stem portion being narrower than said head portion and said head portion projecting laterally beyond said stem portion along one side of said block, said stem portion having a flat face on said one side of said block engageable with a tool body, said head portion being formed to provide a seat for a cutting tool insert at one end of the block, said body having means associated therewith for clamping said insert on said seat, said head portion having a first threaded hole extending inward from the other end of the block, a first adjusting screw threaded in said first hole, said stem portion having an elongate longitudinal slot extending therethrough adjacent said other end of the block spaced from said head portion and said first threaded hole for receiving a screw for mounting the block on a tool body, and said stem portion further having a second threaded hole extending transversely therethrough adjacent said one end of the block, and a second adjusting screw threaded in said second hole.

2. A cartridge-type cutting insert holder as set forth in claim 1 wherein said first hole and said first adjusting screw extend inward from said other end of the block a distance greater than the spacing of the outer end of said slot from said other end of the block without intersecting the slot.

3. A cartridge-type cutting insert holder comprising an elongate block generally of L-shape in transverse section having a head portion and a stem portion constituting the legs of the L, said head portion projecting laterally beyond said stem portion along one side of said block constituting its inner side thereby providing a rib adapted for entry in a groove in a tool body, said head portion having a generally flat top face and generally flat inner and outer side faces substantially at right angles to said top face, said stem portion having a generally flat inside face spaced outward from and substantially parallel to said inner side face of said head portion and a generally flat outside face angled in the direction toward said flat inside face of the stem portion from the lower edge of the outer side face of the head portion, the outer side face of said head portion flaring outward toward one end of the block constituting its forward end, said head portion being formed at said forward end of the block with a triangular recess above said stem portion, one side of said triangular recess being open at said forward end of the block, means associated with said block for clamping a triangular insert in said recess, said head portion having a first threaded hole extending forward from the other and rearward end of the block, a first adjusting screw threaded in said first hole, said stem portion, below said head portion, having an elongate longitudinal slot therethrough adjacent the rearward end of the block spaced from said head portion and said first hole and said first adjusting screw for receiving a mounting screw for mounting the block on a tool body, and said stem portion further having a second threaded hole extending transversely therethrough adjacent the forward end of the block, and a second adjusting screw threaded in said second hole.

4. A cartridge-type cutting insert holder as set forth in claim 3 wherein said first hole and said first adjusting screw extend forward past said slot without intersecting said slot.

5. A cartridge-type cutting insert holder as set forth in claim 1 wherein said clamping means comprises a clamping jaw, a screw extending through the jaw and threaded in the block, the screw being rotatable relative to the jaw, and means on the screw holding the jaw on the screw for axial movement with the screw when the screw is turned in one direction or the other.

6. A cartridge-type cutting insert holder as set forth in claim 5 having means carried by the block and engageable with the jaw for holding the jaw against turning with the screw while permitting axial movement of the jaw with the screw.

7. A cutting insert holder comprising a block having a seat for a cutting tool insert and means for clamping the insert on said seat, said clamping means comprising a clamping jaw, a screw extending through the jaw and threaded in the block, the screw being rotatable relative to the jaw, means on the screw holding the jaw on the screw for axial movement with the screw when the screw is turned in one direction or the other, means carried by the block and engageable with the jaw for holding the jaw against turning with the screw while permitting axial movement of the jaw with the screw, said jaw having a sleeve, the screw extending through the sleeve, said sleeve having a longitudinal slot, said means for holding the jaw against turning with the screw comprising a pin carried by the block extending into said slot, the block having a recess receiving the sleeve, said means holding the jaw on the screw comprising a C-shaped member on the screw engageable with the end of the sleeve in the recess, said pin extending from the bottom of the recess through the gap in said C-shaped member into said slot.

References Cited by the Examiner

UNITED STATES PATENTS

| | | | |
|---|---|---|---|
| 2,062,607 | 12/1936 | Reaney | 29—96 |
| 2,785,456 | 3/1957 | Gairing | 29—96 |
| 2,787,823 | 4/1957 | Kennicott | 29—96 |
| 2,808,638 | 10/1957 | Filippi | 29—96 |
| 2,846,756 | 8/1958 | Novkov | 29—96 |
| 2,848,789 | 8/1958 | Friedline | 29—96 |
| 2,865,084 | 12/1958 | Wendt | 29—96 X |
| 3,152,493 | 10/1964 | Sullivan | 77—58 |

WILLIAM W. DYER, JR., *Primary Examiner.*